March 3, 1931.  R. B. ELSWORTH  1,794,598
RAILWAY TRAFFIC CONTROLLING SYSTEM
Filed Feb. 27, 1929
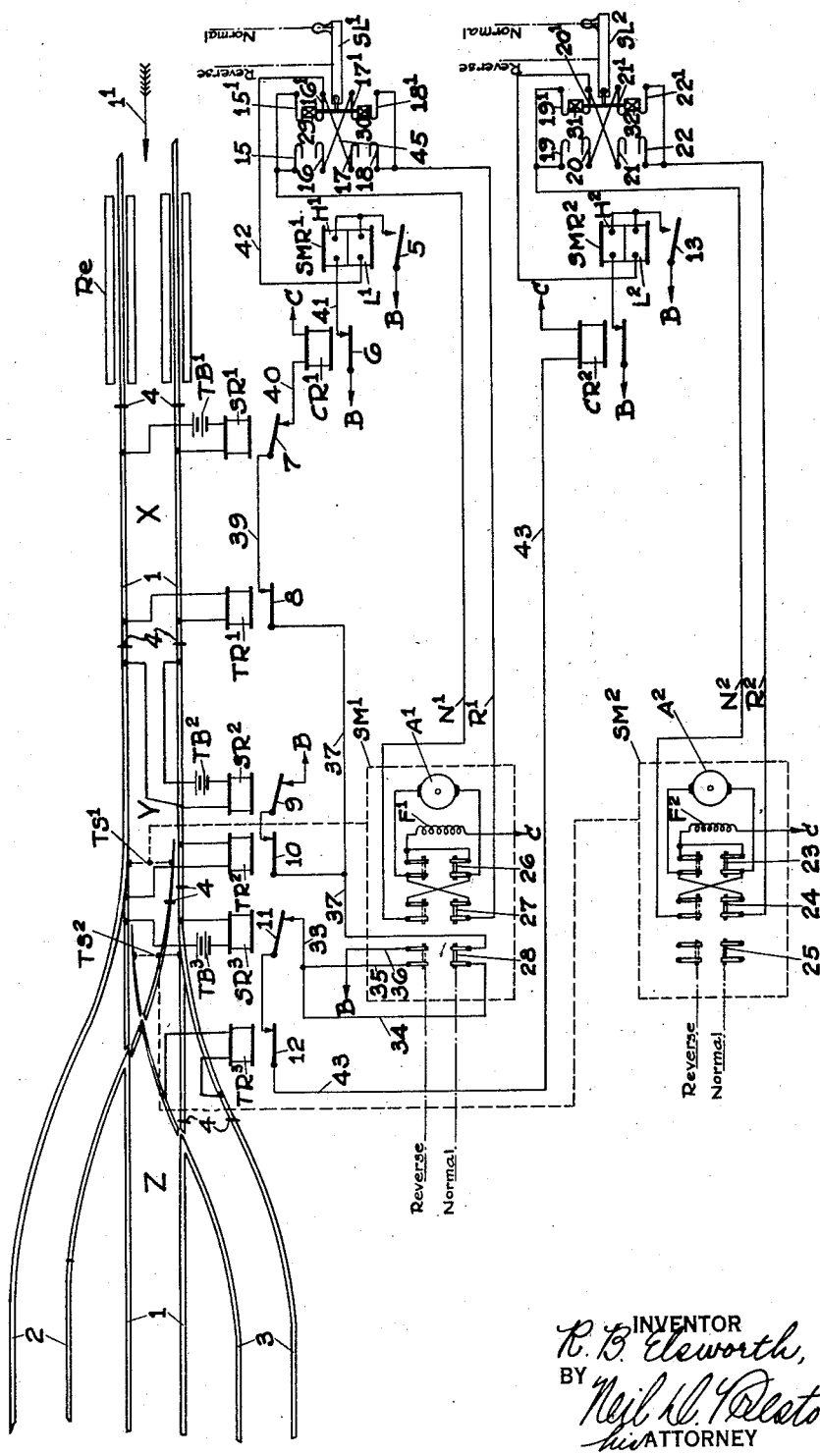

Patented Mar. 3, 1931

1,794,598

UNITED STATES PATENT OFFICE

ROBERT B. ELSWORTH, OF ALBANY, NEW YORK, ASSIGNOR TO GENERAL RAILWAY SIGNAL COMPANY, OF ROCHESTER, NEW YORK

RAILWAY-TRAFFIC-CONTROLLING SYSTEM

Application filed February 27, 1929. Serial No. 343,198.

This invention relates in general to detector track circuits for car retarders, and has more particular reference to circuits used in connection with lap turn-out track switches and a track brake car retarder, and so arranged as to economize in space and to prevent the throwing of a track switch under a car.

In hump yards and classification yards generally, it is always desirable to economize in space, and where an excessive amount of space is required by feeder tracks, having switches and clearance spacing, a considerable part of the car capacity of the yard is thereby lost. In other words, if the feeder track leading from the hump in, for example, a thirty track classification yard, could be reduced one car length, and the classification tracks increased one car length, the yard capacity could be increased by thirty cars.

Where a car retarder of the track brake type is employed to decrease the speed of a car before shunting it through a track switch into a turnout track, it is necessary to provide a section of track, conveniently termed a detector track section, between the exit end of the retarder and the entrance end of a leading point track switch. This detector track section must be long enough, depending on the speed of the car at the exit end of retarder, to require sufficient time for the car to transverse the detector track section, to insure the initiation, and the completion, of the operation of a track switch operating a switch machine, to thus insure the throwing of the track switch before it be reached by a car.

If the switch machine be provided with control means, such as having its energizing circuit pass through the front contact of a track relay, to insure the switch machine against initiation during occupancy of this detector track section, this track section must be long enough to care for the time of operation of the switch machine and also for the time required for the track relay to release its front contact fingers in response to the shunting out effect produced by the occupancy of its track section.

Unless the detector track section between the exit end of the car retarder, and the entrance to the turn out switch, be long enough, the track switch can be energized so tardily as to cause the track switch to be thrown beneath a car.

In my co-pending application Ser. No. 343,197, filed February 27, 1929, I have described an arrangement of track relays in a detector track circuit, in which the relays function much more quickly than in the usual standard, or known circuits. This permits shortening, with safety, the distance between the exit end of the car retarder and the entrance to the first turn out switch.

In applying detector track circuits to classification yards, it is found that space is conserved by overlapping several switches, to thus decrease the length of the feeder tracks and increase the length of the classification tracks. In applying detector track circuits to over lapping switches so as to give sufficient detector sections ahead of given switches to protect such switches, it is desirable that said circuits also be arranged so as to release a given switch for operation as quickly as possible, thus facilitating the equal spacing of the cars coming over the hump, whether the switches through which the car is routed be lap switches or standard single switches.

With the above and other considerations in mind, it is proposed, in accordance with the present invention, to employ, in connection with power operated switch machines used to operate over-lapping track switches, spaced some distance along a track from the exit end of a car retarder, a quick acting track circuit such as set forth in my co-pending application above identified. This circuit is to be used in combination with switch machine circuits controlled in such a manner, that the switches in an over-lapping combination shall have equal length detector track circuits telescoped to permit each track switch to be released in due time to allow equal spacing of cars coming over the hump.

Further objects, purposes and characteristic features will be in part apparent and in part be pointed out, as the description of the invention progresses, reference being made to the accompanying drawings showing, in a wholly diagrammatic manner, and not in any way in a limiting sense, one form which the invention can assume.

In the drawing, the single figure represents, diagrammatically, one form of applicant's invention.

Referring now to the drawing, a stretch of single track is shown constituted by track rails 1, with a turn out track to the right, looking in the direction of arrow $1^1$, constituted by track rails 2, and a turn out track to the left constituted by track rails 3. The turn out track 2 is controlled by a track switch $TS^1$ movable in a usual manner for main line or turn out traffic, and the turn out track 3 is controlled by a track switch $TS^2$, also movable in a usual manner for main line or turn out traffic. The track is furnished with insulating joints 4 in either or both rails for sectionalizing the tracks into sections X, Y, and Z for detector track circuits. At the entrance end of detector track section X, traffic being in the direction of arrow $1^1$, is a car retarder $Re$, which is of any usual track brake type, and can be such, for example, as shown in the patent to Hannauer 1,612,865, granted January 4, 1927.

Sources of current $TB^1$, $TB^2$ and $TB^3$, shown as batteries, are connected respectively to the track rails at the entrance ends of their track sections X, Y and Z, with one side of the battery in each case connected in series to the rail with a series relay SR, for purposes to be later explained.

It will be mentioned here that detector track sections X, Y and Z, are preferably all of equal lengths, and the switches are located at corresponding positions in their respective detector sections.

For operating the track switches $TS^1$ and $TS^2$, there are employed, respectively, switch machines $SM^1$ and $SM^2$, which can be of any usual or suitable form, such for example as shown in the patent to Howe 1,605,546, granted November 2, 1926. The switch machines, which are shown in a wholly diagrammatic manner, include, respectively, armatures $A^1$ and $A^2$, fields $F^1$ and $F^2$, and movable contacts 26, 27, 28, and 23, 24, 25, which comprise their circuit controllers. These contacts are operated by the switch machines to set up either normal or reverse operating circuits, by moving the enumerated contacts from either their dotted line positions to their full line positions, or the reverse, respectively. Located at any convenient point, usually at some distance from the track switches $TS^1$ and $TS^2$ and the switch machines $SM^1$ and $SM^2$, in a signal tower are switch machine control levers $SL^1$ and $SL^2$, manually or otherwise operable to control the energizing circuits for their respective switch machines. These levers $SL^1$ and $SL^2$ can be reciprocated in any usual or desired manner to move contacts 29, 30, and 31, 32, respectively, to bridge fixed contacts $15^1$—$16^1$, $17^1$—$18^1$ or 15—16, 17—18 and $19^1$—$20^1$, $21^1$—$22^1$ or 19—20, 21—22, thus to control the switch machines as below described in greater detail.

For preventing the initiation of the switch machines $SM^1$ and $SM^2$ during the occupancy of their control detector track sections, there are provided control relays $CR^1$ and $CR^2$ and switch machine relays $SMR^1$ and $SMR^2$. The relays $SMR^1$ and $SMR^2$ have two windings, a high resistance winding $H^1$ and $H^2$ respectively, and a low resistance winding $L^1$ and $L^2$ respectively. These relays are provided with front contact fingers 5 and 13 respectively, at times included a stick circuit which will be described later.

For convenience in explanation and simplicity in showing, the opposite terminals of a source or sources of electric energy either AC or DC, are indicated by the letters B and C, in a usual manner.

In connection with the switch machines are control wires $N^1$, $R^1$ and $N^2$, $R^2$ for controlling normal and reverse conditions respectively.

The usual procedure in a classification yard, in connection with classifying cars, is to pass the cars through a retarder, such as $Re$, in equal spacing, so as to decrease the speed sufficiently to allow each car to pass through the following track switches and pass onto turn out tracks with safety.

It will be observed that when the detector track section X, defined by insulating joints 4, is unoccupied, relay $TR^1$ is energized and relay $SR^1$ is de-energized due to the fact that the constants are so chosen that the current which flows through the relay $TR^1$ with section X unoccupied, is of such a value as to be insufficient to pick up relay $SR^1$. As soon as a car leaves the retarder $Re$, it immediately occupies the entrance end of track section X, thus shunting the detector track circuit, with the effect that a greater current flows through $SR^1$ to immediately pick up the contacts 7 of relay $SR^1$, and this is accomplished much more quickly than can relay $TR^1$ open its front contact by dropping its finger 8.

The track sections Y and Z are furnished in a manner similarly to track section X, with relays $TR^2$, $SR^2$, and $TR^3$, $SR^3$, controlling their respective circuits and functioning in the same manner, as do relays $TR^1$ and $SR^1$ in track section X.

For convenience in explanation, all the apparatus is shown in the normal position, thus positive battery can flow through the back contact 9 of relay $SR^2$, front contact 10 of relay $TR^2$, wire 38, front contact 8 of relay $TR^1$, wire 39, back contact 7 of relay $SR^1$, wire 40, and winding of relay $CR^1$, to common. This energizes control relay $CR^1$, to close its front contact 6, for completing a control circuit for switch machine $SM^1$ so that the switch machine can be reversed if lever $SL^1$ is thrown to the reverse position.

Considering that control relay $CR^1$ is in an energized position, as described in the preceding paragraph, when X is unoccupied, we will assume that the operator desires to route a car from the main track through switch $TS^1$, onto rails 2. To throw switch $TS^1$ to reverse position, the operator moves lever $SL^1$ to the reverse position. Inasmuch as control relays $CR^1$ is energized, as soon as the lever $SL^1$ reaches its reverse position, positive current flows through front contact 6, of relay $CR^1$, wire 41, high resistance winding $H^1$ of relay $SMR^1$, low resistance winding $L^1$, of relay $SMR^1$, wire 42, wire 45, contacts 17, 30, 18, wire $R^1$, movable contact 27, armature $A^1$, movable contact 26, field $F^1$, and to common. The current which flows is of sufficient value to at once pick up contact finger 5 of relay $SMR^1$, thus permitting positive current of sufficient value to operate the switch machine to flow from B, through front contact 5, low resistance winding $L^1$, wire 42, etc. as described just above, to thus operate switch machine $SM^1$.

It should be noted here that switch machine $SM^2$, with its control lever $SL^2$, operates to reverse position, in the same manner, and under the same conditions, as described above, for switch machine $SM^1$ and lever $SL^1$. Since the subject matter concerning the operation of quick acting detector circuits, control levers and switch machines, is more fully covered in applicant's above referred to copending application, only the circuits included within the present invention will be explained in detail.

Under the normal condition of apparatus and circuits, as shown control relay $CR^2$ is energized through back contact 9, of relay $SR^2$ front contact 10, of relay $TR^2$, wire 37, movable contact 28, wires 34 and 33, back contact 11, of relay $SR^3$, front contact 12, of relay $TR^3$, wire 43, winding of relay $CR^2$, and to common.

With the control circuits, described above in the normal condition, the operator can throw either track switch $TS^1$ or $TS^2$ to reverse position as long as there is no car upon any detector track circuit.

Assuming a car leaving the exit end of the retarder $Re$, in the direction of arrow $1^1$, and entering detector section X, relay $SR^1$ is at once energized, and slightly later relay $TR^1$ is de-energized, thus in each case breaking the energizing circuit, as described above, for control relay $CR^1$. This prevents initiation of switch machine $SM^1$ during occupancy of detector track section X.

As this same car proceeds, as soon as it occupies detector track section Y, relay $SR^2$ is energized and relay $TR^2$ is de-energized, thus, in each case, opening the control circuit for relay $CR^2$ which insures against initiation of switch machine $SM^2$ during occupancy of detector track section Y. Thus the control of the sections governing the approach to the switches $TS^1$ and $TS^2$ has been described.

Again assume under normal conditions, that the operator reverses lever $SL^1$, to move switch $TS^1$ to reverse position, routing a car onto track 2. In doing this, the operation of switch machine $SM^1$ has moved contact 28 to its reverse or dotted position giving positive battery through wires 36, 35 and 33, back contact 11, of relay $SR^3$, front contact 12, of relay $TR^3$, and wire 43, to energize the relay $CR^2$.

Thus, it is seen that a car leaving the exit and of the retarder $Re$, opens the control circuit of relay $CR^1$ as soon as it occupies detector track section X, by picking up $SR^1$ and dropping $TR^1$, and still maintains that circuit open until it leaves track section Y, by picking up $SR^2$ and dropping $TR^2$, but during this period, if $SM^1$ is operated reverse, and track section Z unoccupied, $SM^2$ can be operated inasmuch as control relay $CR^2$ can receive energy through wire 36, movable contact 28, wire 35, wire 33, back contact 11 of $SR^3$, front contact 12 of $TR^3$, wire 43, and through relay $CR^2$ to common. Otherwise stated, with $SM^1$ and $TS^1$ operated to reverse, the control relay $CR^2$ for $SM^2$ is taken out of control of relays $SR^2$ and $TR^2$, and is under control of relays $SR^3$ and $TR^3$ only.

Again, under normal conditions, if the operator wishes to route a car onto tracks 3 he moves lever $SL^2$ to reverse position, thus operating switch $TS^2$ to reverse position. With a car leaving the exit end of the retarder $Re$, the energizing circuit of control relay $CR^1$ is broken as soon as the car enters the track section X. But the control circuit of control relay $CR^2$ is not broken until the car enters the track section Y, at which time, and only if $TS^1$ has not been moved to reverse, the energization of relay $SR^2$ and the de-energization of the relay $TR^2$ breaks the control circuit to the relay $CR^2$ which circuit is maintained open so long as the car occupies either the track section Y, or the track section Z, due to the fact that relay $SR^3$ is energized and relay $TR^3$ is de-energized, thus continuing the condition set up when the car first entered track section Y. However, as soon as a car leaves the detector track section Y the relays $SR^2$ and $TR^2$ assume their normal positions, this renders the energizing circuit for relay $CR^1$ closed, so that, although the car may be in the detector track section Z, preventing the switch $TS^2$ being thrown, the switch $TS^1$ is relieved from such control so that it can be operated at the will of the operator. The same result occurs as a car passes onto track rails 2, as the detector track section Z is in common with track rails 1 and with track rails 3.

To summarize, there are three detector track sections, X, Y and Z, with track switch TS¹ and TS² located in sections, Y and Z respectively, and operable at times, by switch machines SM¹ and SM². Switch machine SM¹ can never be initiated during occupancy of sections X and Y, but can always be initiated regardless of occupancy of section Z. On the other hand, with SM¹ operated to reverse, SM² can be initiated regardless of occupancy of sections X and Y, if section Z be unoccupied, and with SM¹ in normal position, SM² can be initiated regardless of occupancy of section X only, and only if sections Y and Z are unoccupied.

It might be reiterated here, that the track sections X, Y and Z are preferably of equal lengths, and that the switch TS¹ is located at the same distance from the entrance to track section Y, as the switch TS² is from the entrance to the track section Z, with these positions of the switches such, that when the rear trucks of a car have left a track section, the switch points within that track section are completely free to be moved.

The detector track circuits are so arranged that each switch has approach protection of one track section plus the distance that the given switch is from the entrance to its own track section, except where a preceding switch as TS¹, is in turn out position, when such protection is not needed and the control of the succeeding switch, as TS² is in its own track section, Z, only. Also each switch is relieved from its locked condition as soon as a car leaves the exit end of the track section in which the switch is located. Hence it is seen that the detector track circuits are so arranged in combination with the track relays and switch machine circuit controllers that individual control is given to each switch the same as if the switches were not overlapped.

Thus, a detector track circuit has been described for use with over-lap switches in a classification yard where power operated switch machines are used in conjunction with track brake type car retarders, with said detector track circuit giving standard detector protection to the track switches and at the same time allowing cars to be passed down the hump with the cars spaced at a distance equal to any distance not less than twice the length of one detector track section.

It is to be understood that detector track sections can be varied in length to suit conditions, and that they can be of unequal lengths, in whch case the spacing of the cars will be equal to the greatest distance involved which will be the sum of the lengths of the longest track section plus the length of the track section immediately in advance thereof.

It is also to be understood that, as in practice switches are often overlapped more than twice, so also can this circuit, which has been described to embody the present invention, be applied to such overlapping switches which contain more than two overlaps, by means of using the circuit controllers available in each of the additional switch machines controlling their respective switches.

The above rather specific description of one form of the present invention is given solely by the way of illustration, and is not intended, in any manner whatsoever, in a limiting sense. Obviously, the invention can assume many different physical forms, and is suspectible of numerous modifications, and all such forms and modifications are intended to be included in this application as come within the scope of the appended claims.

Having described my invention, I now claim.

1. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, means whereby the first and second track circuits control the operating means for one of said track switches, and means whereby the second and third track circuits control the operating means for the other said track switch.

2. In a control system, in combination, a stretch of main track, a track brake at one end of said stretch, a first and a second track switch, arranged in overlapped relation, diverging from the other end of said stretch, a first, a second, and a third detector track circuit, all of equal length, in said stretch, a means for operating each of said track switches, means whereby the first and second track circuits control the operating means for one of said track switches, and means whereby the second and third track circuits control the operating means for the other said track switch.

3. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, means whereby the first and second track circuits control the operating means for one of said track switches, and means whereby the second and third track circuits, or the third track circuit only, control the operating means for the other said track switch.

4. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, means whereby the first and second track circuits control the operating means for one of said track switches, and means whereby the second and third track circuits, or the third track circuit only, depending on whether said first track switch is in normal, or in reverse, position respectively, control the operating means for the other said track switch.

5. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, a track relay connected across one end of each track circuit, a source of electrical energy and a series relay connected in series circuit across the other end of each track circuit, means whereby the relays in the first and second track circuits jointly control the operating means for said first track switch, and means whereby the relays in the second and third track circuits jointly control the operating means for said second track switch.

6. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, a track relay connected across one end of each track circuit, a source of electrical energy and a series relay connected in series circuit across the other end of each track circuit, means whereby the relays in the first and second track circuits jointly control the operating means for said first track switch, and means whereby the relays in the second and third track circuits, or the relays in the third track circuit only, depending on the position of said first track switch, jointly control the operating means for said second track switch.

7. In a control system, in combination, a stretch of main track, a track brake at one end of said stretch, a first and a second track switch, arranged in overlapped relation, diverging from the other end of said stretch, a first, a second, and a third detector track circuit in said stretch, a means for operating each of said track switches, a track relay connected across one end of each track circuit, a source of energy and a series circuit across the other end of each track circuit, means whereby a circuit through a front point of the track relay and a back point of the series relay, of the relays in the first and second track circuits, jointly control the operating means for said first track switch, and means whereby a circuit through a front point of the track relay and a back point of the series relay, of the relays in the second and third track circuits, jointly control the operating means for said second track switch.

8. In a control system, in combination, a stretch of main track, a track brake at one end of said stretch, a first and a second track switch, arranged in overlapped relation diverging from the other end of said stretch, a first, a second, and a third detector track circuit in said stretch, a means for operating each of said track switches, a track relay connected across one end of each track circuit, a source of electrical energy and a series relay connected in series circuit across the other end of each track circuit, means whereby the relays in the first and second track circuits jointly control the operating means for said first track switch, and means whereby the relays in the second and third track circuits, jointly control the operating means for said second track switch, initiation of either operating means being possible only during nonoccupancy of the respective controlling track circuits.

9. In a control system, in combination, a stretch of main track, a track brake at one end of said stretch, a first and a second track switch, arranged in overlapped relation diverging from the other end of said stretch, a first, a second, and a third detector track circuit in said stretch, with said track circuits being of equal lengths and said track switches being positioned, respectively, at corresponding positions in said second and third track circuits.

In testimony whereof I affix my signature.

ROBERT B. ELSWORTH.